June 25, 1963 S. DUINKER 3,094,772

METHOD OF PRODUCING MAGNETIC HEADS WITH ACCURATELY PREDETERMINED GAP HEIGHTS

Filed June 26, 1957

INVENTOR
SIMON DUINKER

BY Frank R. Jifaro
AGENT

United States Patent Office 3,094,772 Patented June 25, 1963

3,094,772

METHOD OF PRODUCING MAGNETIC HEADS WITH ACCURATELY PREDETERMINED GAP HEIGHTS

Simon Duinker, Eindhoven, Netherlands, assignor to North American Philips Company, Inc., New York, N.Y., a corporation of Delaware Filed June 26, 1957, Ser. No. 668,119
Claims priority, application Netherlands July 26, 1956
5 Claims. (Cl. 29—155.59)

Figure 1:
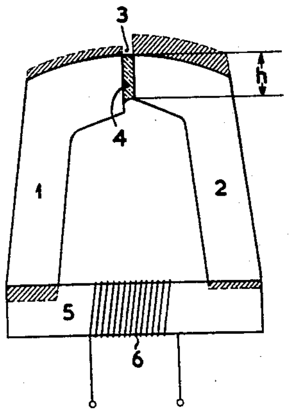

This invention relates to a method of manufacturing magnetic recorder and/or reproducer heads for recording or reproducing magnetic recordings, which heads comprise at least two circuit parts of sintered ferromagnetic oxide material, between which an effective gap is formed. The gap is filled with glass which serves as non-magnetic material to protect the gap and which also serves to join the two circuit parts to one another mechanically; the invention also relates to magnetic recorder or reproducer heads manufactured by this method.

When manufacturing magnetic recorder and/or reproducer heads, it is of importance to ensure that the magnetic resistance which the effective gap introduces into the ferromagnetic circuit, is a maximum in order that a maximum part of the magnetic flux, which is produced by the signals which are magnetically recorded on a suitable carrier, flows through the ferromagnetic circuit. To this end, the gap height must be a minimum with a given head width.

However, for a correct determination of the properties of the head and also with a view to the reproducibility, the gap height must also be well-defined.

In U.S. Patent 3,024,318, a method has been described in which initial use is made of two symmetrical component parts, a glass foil being interposed between the accurately finished, for example polished, gap surfaces, the thickness of this foil exceeding the ultimately desired gap width by a few percent, after which the assembly is heated to a temperature lying in the softening range of the glass and subsequently is compressed at a temperature lying in this softening range under a pressure such that, after hardening of the glass, the correct gap width is set.

It has been found in practice that, when use is made of two symmetrical component parts, the accuracy of the ultimately produced gap height is limited by lack of accuracy in the symmetrical arrangement of the two halves, since it should be borne in mind that the relative fixation of the two halves must be effected at temperatures between 500° C. and 1000° C., a molten glass layer being interposed between them.

It is an object of the present invention to obviate this disadvantage and according to the invention, a method of manufacturing magnetic recorded and reproduced heads is characterized in that initial use is made of two component parts which are each provided with at least one accurately finished surface, that these parts are arranged so that the said surfaces engage one another but for the interposition of a glass foil, the thickness of which exceeds the ultimately desired gap length by a few percent, that in the direction of the gap height one surface exceeds the other, that the assembly is heated, to a temperature lying in the softening range of the glass and subsequently is compressed at a temperature lying in this softening range under a pressure such that, after hardening of the glass, the correct gap length is set. Further, after the assembly has cooled, the guide face of the head is provided by an accurate finishing operation, the determination of the gap height being based on the surface which is smaller in the direction of the gap height.

The prior art method will be explained more fully with reference to FIG. 1 of the accompanying drawings and the method in accordance with the invention will be described more fully with reference to FIGURES 2, 3 and 4 of these drawings.

Figure 2:
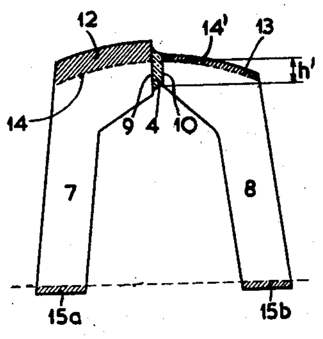

FIG. 1 is a cross-sectional view of a magnetic recorder or reproducer head manufactured by the prior art method. Reference numerals 1 and 2 designate two circuit parts of sintered ferromagnetic oxide material, between which an effective gap 3 is formed which is filled with glass 4 which serves as non-magnetic material to protect the gap and also to join the two circuit parts to one another mechanically. A closing yoke, which together with the parts 1 and 2 constitutes the ferromagnetic circuit of the magnetic recorder or reproducer head, is designated 5.

In the embodiment shown, a coil 6 is provided on the circuit part 5.

It is assumed that in manufacture initial use is made of two identical parts 1 and 2. The original shapes of these parts and their relative positions after hardening of the glass are shown by broken lines. Subsequently, the shaded parts are removed by grinding, for example by polishing. In spite of the accuracy with which this operation can be performed, the gap height, which is designated by *h*, cannot be determined within narrow limits owing to the uncertainty with respect to the relative position of the two parts, which is not readily controllable.

In addition, the parts 1 and 2 may be twisted with respect to one another and it will be appreciated that this does not make for accuracy in the gap height.

These disadvantages do not occur in the method in accordance with the invention, which will be described more fully with reference to FIG. 2. Initial use is made of two component parts 7 and 8, which are each provided with an accurately finished surface 9 and 10 respectively. Between the surfaces 9 and 10 a glass foil 4 is interposed, the thickness of which exceeds the ultimately desired gap length by a few percent. In the direction of the gap height, the surface 9 exceeds the surface 10. The assembly thus obtained is heated to a temperature lying in the softening range of the glass and compressed at a temperature lying in this softening range under a pressure such that, after hardening of the glass, the correct gap length is set.

Obviously, the magnitude and the time of action of the force depend upon the properties of the glass used, upon the cross-sectional area of the magnetic circuit at the effective gap and also upon the temperature at which the force is exerted.

It has been found that, when using sintered ferromagnetic oxide material for the circuit parts of the magnetic recorder or reproducer head, the glass adherence thus achieved has a strength which is of the same order of magnitude as that of the circuit parts themselves.

It should be noted that preferably glass is used, the coefficient of expansion of which, for the temperature at which the magnetic recorder head is used, is approximately equal to, for example does not differ by more than 5% from, the coefficient of expansion of the ferromagnetic material, however, preferably use is made of glass, the coefficient of expansion of which, throughout the entire temperature range lying between the temperature at which the magnetic recorder is used and the temperature at which the glass begins to soften, is approximately equal to, for example does not differ by more than 10% from, the coefficient of expansion of the ferromagnetic material.

After the assembly has been sufficiently cooled, a guide face 14 is provided by removing parts 12 and 13, which are shown shaded, by means of an accurate machining operation, for example by polishing. As the directive surface for this operation, use is made of the surface 14′ of the part 8. The height *h′* of the part 8 is accurately adjustable. Owing to the fact that the surface 9 exceeds the surface 10 on either side in the direction of the gap height, this height *h′* of the part 8 will invariably also be the height of the effective gap, irrespective of the position of the part 7 with respect to the part 8 (provided that the surface 10 lies within the surface 9).

Subsequently, surfaces **15*a* and 15*b* of the parts 7 and 8** are finished and finally a closing yoke, on which a coil is provided, is arranged along these surfaces.

Advantageously, initial use is made of two component parts each provided with two accurately finished surfaces along which the component parts engage one another. In FIG. 3, two such component parts are designated 16 and 17. Both parts are provided with two accurately finished surfaces 18, 19 and 20, 21 respectively. A glass foil 4 is interposed between surfaces 18 and 20. It has been found that, when the assembly is heated to a temperature lying in the softening range of the glass, not only surfaces 18 and 20 are secured to one another by the glass foil, but also surfaces 19 and 21 have grown together by recrystallisation and diffusion processes, so that the magnetic resistance of this joint becomes negligible. In order to increase the mechanical strength of this joint, a glass rod can be arranged in a groove 22 formed in either of parts 16 and 17 (in the figure, in part 17), which rod also softens on heating and provides a strong adherence at this point.

In the last-mentioned example, the glass 4, which is used as the non-magnetic material, is not restricted to the effective gap but also fills part of the space formed by the circuit parts 16 and 17. Such an additional amount of glass 23 imparts an additional rigidity to the circuit in the vicinity of the effective gap and also enables the height of this gap to be reduced by grinding to a desirable very small value without the risk of an appreciable reduction of the strength of the circuit in the proximity of the gap.

Figure 3:
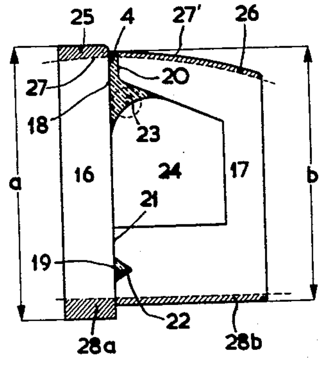

This additional amount of glass can be provided simply by arranging, prior to heating, a glass rod at the inner side of the ferromagnetic circuit parallel to, and in close proximity to, the effective gap (this rod is shown diagrammatically in FIGURE 3 by a broken circle). During heating, the glass spreads to form a layer as shown in the figure.

The surface 18 again exceeds the surface 20. It will be appreciated that such a relationship is not necessary for the surfaces 19 and 21 since there is no gap between them; surfaces 19 and 20 may be considerably larger than the surfaces 18 and 20. By using a flat piece of material as the component part containing the surfaces 18 and 19 (reference numeral 16 in the embodiment shown), the dimension *a* of which in the direction of the gap height exceeds the corresponding dimension *b* of a profiled component part (reference numeral 17), it is ensured that the surface 18 exceeds the surface 20; in addition only one of the component parts need be elaborately worked in order to provide the space 24 and the groove 22.

Finally, a guide face 27 is provided by removing parts 25 and 26, which are shown shaded, by grinding. As the directive surface for this operation, use is made of a surface 27′ of the part 17. If required, parts **28*a* and 28*b*, which are shown shaded, can also be removed by grinding. The coil of the magnetic recorder or reproducer head can be provided either on the part 16 or on the part 17**.

Figure 4:
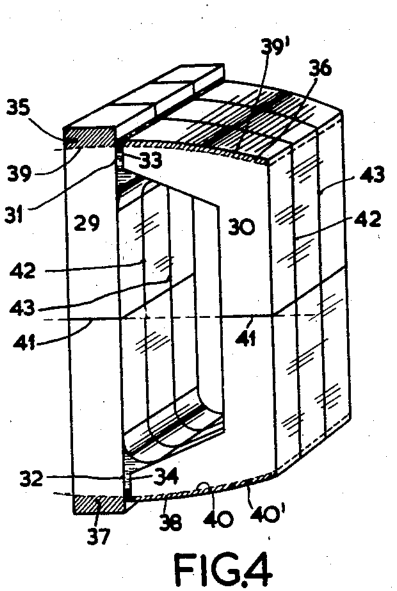

With reference to FIG. 4 a method will now be described in which initial use is also made of two component parts 29 and 30, which are each provided with two accurately worked surfaces 31, 32 and 33, 34 respectively. However, a glass foil is interposed between each pair of surfaces, whilst, in the direction of the gap height, not only is surface 33 smaller than surface 31, but also surface 34 smaller than surface 32. Here also, the part 29 is a flat piece of material, the dimension of which, in the direction of the gap height, exceeds the corresponding dimension of the profiled part 30. After the heat treatment, parts 35, 36, 37 and 38, which are shown shaded, are removed by accurate machining, surfaces 39′ and 40′ of part 30 being used as the directive surfaces. The assembly is now provided with two guide faces 39 and 40.

Subsequently, the assembly is sawed in two along a plane 41, so that two circuit parts are produced which can each be completed by a closing yoke on which a coil is provided.

It should be noted that the assembly can also be cut up along one or more planes at right angles to the direction of the gap width, for example planes 42 and 43.

Thus, a number of circuit parts can be produced from a single part manufactured by the method in accordance with the invention. Obviously, a similar process can be used for the constructions shown in FIGURES 2 and 3.

What is claimed is:

1. A method of manufacturing magnetic heads for recording or reproducing magnetic recordings, comprising the steps of interposing a non-magnetic material capable of being softened when heated between machined exposed surfaces of two magnetic circuit parts, each of said surfaces having dimensions of height and width, each of said height dimensions being measured between top and bottom edges of the respective surface, the height dimension of the surface of one of said parts exceeding the height dimension of the other, heating the assembly to a temperature lying in the softening range of the non-magnetic material, the magnetic circuit parts having a higher softening range than the non-magnetic material, compressing said assembly during heating until a desired thickness between the surfaces is set, cooling the assembly, maintaining the top and bottom edges of said other surface between the top and bottom edges, respectively, of said one surface while the assembly is being heated and cooled, and machining one end of said assembly including both surfaces comprising the guide face of the head, the surface which is smaller in said height dimension determining the gap height of the head.

2. A method as claimed in claim 1, wherein the non-magnetic material comprises glass and the magnetic material comprises a sintered ferromagnetic oxide.

3. A method as claimed in claim 1 wherein each of said circuit parts is provided with a second surface, said second surfaces being in contact with each other before and after heating.

4. A method as claimed in claim 3, wherein at least one of said second surfaces has a groove formed therein which is filled, prior to heating, with said non-magnetic material.

5. A method as claimed in claim 1, wherein each of said component parts is provided with a second surface, said second surfaces being machined and having a glass foil interposed in a gap therebetween before the assembly is heated, said second surfaces also having dimensions of height and width, the height dimensions being measured between top and bottom edges of the respective surfaces, one of said second surfaces exceeding the other in the height dimension, the top and bottom edges of said other of said second surfaces being maintained between the top and bottom edges of said one surface while the assembly is being heated and cooled, and subsequent to cooling, dividing the assembly in two parts, each of said parts having a pair of surfaces between which a non-magnetic material is interposed.

References Cited in the file of this patent

UNITED STATES PATENTS

| | | |
|---|---|---|
| 1,748,993 | Prudy | Mar. 4, 1930 |
| 1,843,518 | Reime et al. | Feb. 2, 1932 |
| 1,961,706 | Pajes | June 5, 1934 |
| 2,346,555 | Cobb | Apr. 11, 1944 |
| 2,361,753 | Eilenberger | Oct. 31, 1944 |
| 2,485,839 | O'Dea | Oct. 25, 1949 |
| 2,504,509 | Erickson | Apr. 18, 1950 |
| 2,555,110 | Bobb | May 29, 1951 |
| 2,676,392 | Buhrendorf | Apr. 27, 1954 |
| 2,677,019 | Buhrendorf | Apr. 27, 1954 |
| 2,699,532 | Bussing | Jan. 11, 1955 |
| 2,711,945 | Kornei | June 28, 1955 |
| 2,728,054 | Schoenberg | Dec. 20, 1955 |
| 2,772,135 | Hollabaugh et al. | Nov. 27, 1956 |
| 2,785,038 | Ferber | Mar. 12, 1957 |
| 2,866,013 | Reis | Dec. 23, 1958 |
| 2,872,530 | Jolly | Feb. 3, 1959 |
| 2,921,143 | Selsted et al. | Jan. 12, 1960 |